United States Patent
Ando

(10) Patent No.: US 12,477,226 B2
(45) Date of Patent: Nov. 18, 2025

(54) INFORMATION PROCESSING APPARATUS, METHOD OF GENERATING MOVING PATH, AND COMPUTER-READABLE MEDIUM STORING PROGRAM

(71) Applicant: CANON KABUSHIKI KAISHA, Tokyo (JP)

(72) Inventor: Yoshito Ando, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/165,989

(22) Filed: Feb. 8, 2023

(65) Prior Publication Data

US 2023/0269478 A1    Aug. 24, 2023

(30) Foreign Application Priority Data

Feb. 21, 2022    (JP) .................................. 2022-024917

(51) Int. Cl.
*H04N 23/695*    (2023.01)
*H04N 7/18*    (2006.01)

(52) U.S. Cl.
CPC ........... *H04N 23/695* (2023.01); *H04N 7/181* (2013.01)

(58) Field of Classification Search
None
See application file for complete search history.

(56) References Cited

U.S. PATENT DOCUMENTS

| | | | | |
|---|---|---|---|---|
| 11,492,113 B1 * | 11/2022 | Kipurs | ................... | G05D 1/106 |
| 2010/0002083 A1 * | 1/2010 | Takenaka | .................. | H04N 7/18 |
| | | | | 348/169 |
| 2010/0134627 A1 * | 6/2010 | Yen | ........................ | G06V 20/52 |
| | | | | 348/159 |
| 2015/0163408 A1 * | 6/2015 | Laroia | ...................... | H04N 5/77 |
| | | | | 348/208.1 |
| 2018/0154518 A1 * | 6/2018 | Rossano | ................ | B25J 9/1671 |
| 2020/0309545 A1 * | 10/2020 | Michel | ................... | G08G 1/005 |
| 2022/0270296 A1 * | 8/2022 | He | ......................... | H04N 23/60 |

FOREIGN PATENT DOCUMENTS

| | | | |
|---|---|---|---|
| JP | 2001268563 A | | 9/2001 |
| JP | 2008079216 A | | 4/2008 |
| JP | 2010010930 A | | 1/2010 |
| JP | 2011188258 A | | 9/2011 |
| JP | 2019003062 A | | 1/2019 |

OTHER PUBLICATIONS

Japanese Office Action issued Jan. 5, 2024, in corresponding Japanese Patent Application No. 2022-024917, with English translation (10 pages).

* cited by examiner

*Primary Examiner* — Edemio Navas, Jr.
(74) *Attorney, Agent, or Firm* — Venable LLP

(57) ABSTRACT

An information processing apparatus includes one or more memories storing instructions, and one or more processors that, upon executing the stored instructions, perform obtaining a video obtained by an image capturing apparatus that captures a predetermined area, setting a first area that is a portion of the predetermined area to be captured by the image capturing apparatus and a second area that is a portion of the predetermined area to be captured, and is different from the first area, detecting an object in an area different from the first area and the second area of the obtained video, and generating a moving path of an image capturing area that moves between the first area and the second area based on a position of the detected object.

20 Claims, 11 Drawing Sheets

| PRESET ID | A | B | ... |
|---|---|---|---|
| PTZ COORDINATES | (p1,t1,z1) | (p2,t2,z2) | ... |

| OBJECT ID | 1 | 2 | ... |
|---|---|---|---|
| THREE-DIMENSIONAL COORDINATES | (c1x,c1y,c1z) | (c2x,c2y,c2z) | ... |
| SIZE INFORMATION | (s1h,s1w,s1d) | (s2h,s2w,s2d) | ... |

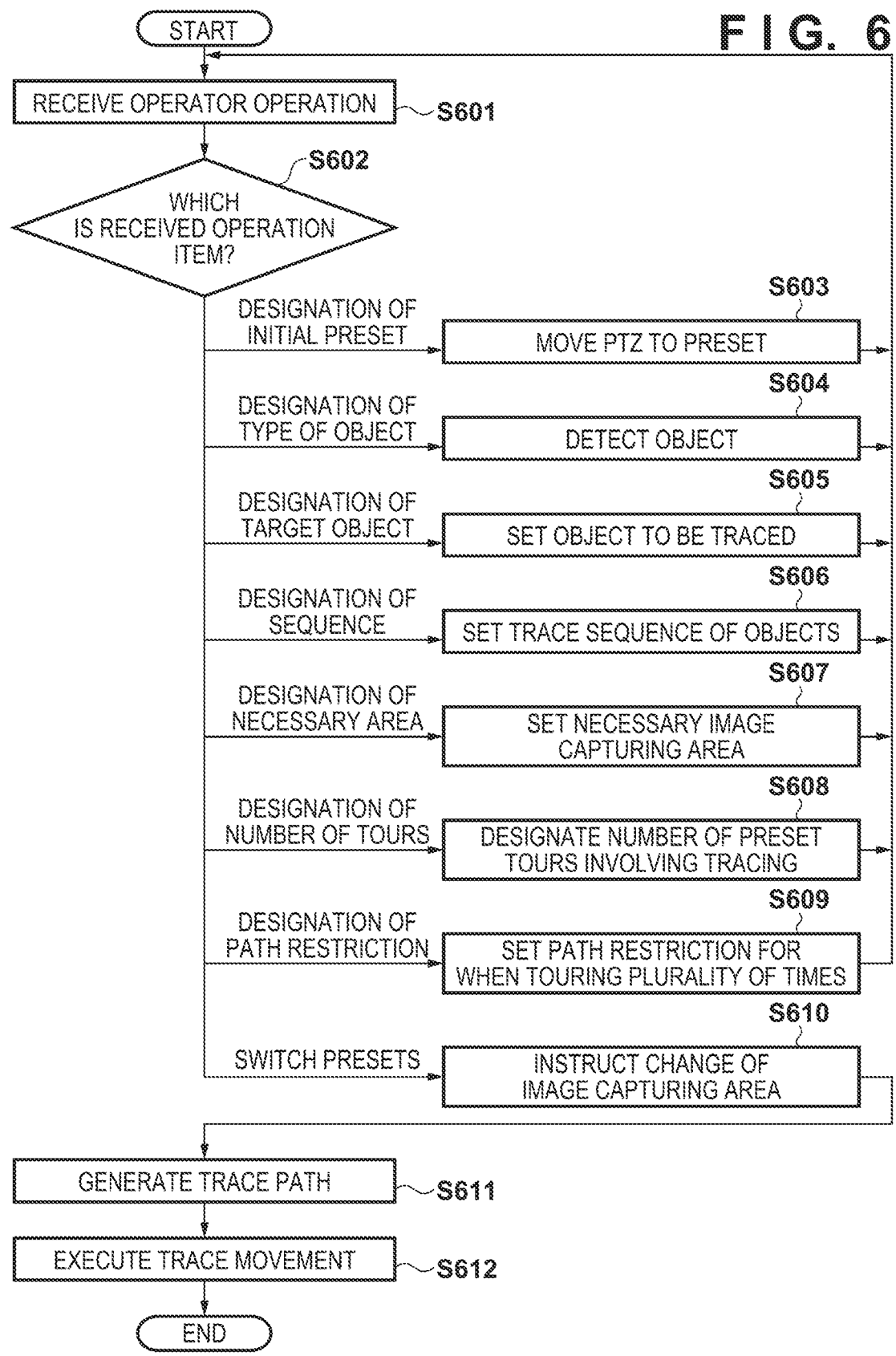

INFORMATION PROCESSING APPARATUS, METHOD OF GENERATING MOVING PATH, AND COMPUTER-READABLE MEDIUM STORING PROGRAM

CROSS REFERENCE TO PRIORITY APPLICATION

This application claims the benefit of Japanese Patent Application No. 2022-024917, filed Feb. 21, 2022, which is hereby incorporated by reference herein in its entirety.

BACKGROUND

Field of the Invention

The present disclosure relates to an information processing apparatus, a method of generating a moving path, and a computer-readable medium storing a program.

Description of the Related Art

In recent years, with an increase in online events, and the like, a demand for live distribution and video production has increased. Examples include video capturing of entertainment, such as music events and plays, video capturing for e-learning, such as lectures, and video capturing for business, such as online presentations and online conferences. As a camera to be used for such video capturing, a pan-tilt-zoom (PTZ) camera capable of realizing image capturing from a plurality of types of angles of view in a single camera is known. Panning and tilting are functions for changing the angle of view by rotating the lens or the entire camera horizontally or vertically with respect to an installation surface. Zooming is a function of changing the angle of view by optically or electronically enlarging or reducing a video to be outputted. Further, in a PTZ camera, a preset function in which an operator who operates the camera can set in advance a desired image capturing area (angle of view) is known. The image capturing area (angle of view) is set by designating PTZ coordinates. The image capturing area set in advance by the operator is called a preset. The preset function includes a preset tour for automatically touring a plurality of presets, a preset movement for changing the image capturing area (angle of view) of the PTZ camera by the operator designating a particular preset, and the like.

Japanese Patent Laid-Open No. 2019-003062 (the '062 document) discloses a technique in which an area for which usage frequency is high, is recognized from a range in which a PTZ camera can perform image capturing and based on information related to usage frequency, a moving path, for when a preset operation is performed, is selected from a plurality of paths for reaching a target position at the time of preset operation. Further, Japanese Patent Laid-Open No. 2011-188258 (the '258 document) discloses a technique in which during a preset tour in which a plurality of presets are toured, a preset is set using position information of a person's face detected from an image generated by the camera.

However, in the techniques described in the '062 document and the '258 document, a moving path of the image capturing area (angle of view) for when image capturing areas are switched due to a preset being designated is set independently of the presence of an object, or the like. Therefore, in the '062 document and the '258 document, when the switching of the image capturing areas is instructed, only a video in which the angle of view moves along the shortest path connecting the image capturing areas, a path along which the user has performed an operation in advance, or the like, for example, can be captured. Therefore, a video to be captured while the angle of view (image capturing area) moves between the designated image capturing areas is a video that can hardly be said to be suitable for viewing.

SUMMARY

An aspect of the present disclosure provides a technique for automatically generating a moving path such that a video to be captured during movement of an image capturing area between image capturing areas will be a video that is more suitable for viewing.

According to one embodiment of the present disclosure, an information processing apparatus comprises one or more memories storing instructions; and one or more processors that, upon executing the stored instructions, perform obtaining a video obtained by an image capturing apparatus, setting a first area that is a portion of an area to be captured by the image capturing apparatus and a second area that is a portion of the area to be captured, and is different from the first area; detecting an object in the obtained video, and generating a moving path of an image capturing area that moves between the first area and the second area based on a position of the detected object.

Further features of the present disclosure will become apparent from the following description of exemplary embodiments with reference to the attached drawings.

BRIEF DESCRIPTION OF THE DRAWINGS

FIG. 6 is a flowchart for explaining processing for generating a moving path by the information processing apparatus according to the first embodiment.

DESCRIPTION OF THE EMBODIMENTS

Figure 1:
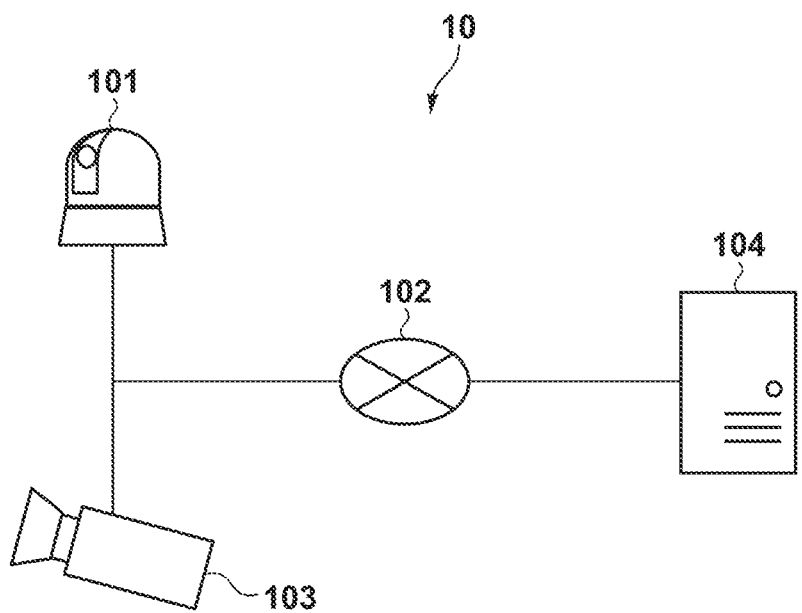
FIG. 1 is a diagram illustrating an example of a configuration of a video production system according to a first embodiment.

Hereafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating an example of a configuration of a video production system according to a first embodiment. In a video production system 10, a PTZ camera 101 and a camera 103, which are examples of image capturing apparatuses, are connected to an information processing apparatus 104 via a network 102. The PTZ camera 101 includes a pan-tilt-zoom (hereafter, a PTZ) mechanism. A plurality of preset image capturing areas or angles of view (hereafter, presets) for the PTZ camera 101 can be registered in the information processing apparatus 104. When a desired preset is designated from a plurality of registered presets by an operator, the information processing apparatus 104 instructs the PTZ camera 101 to move the image capturing area to the designated preset. The image capturing area is an angle of view of the PTZ camera 101 that can be expressed by a PTZ value. The image capturing area and the preset have a one-to-one relationship. The PTZ camera 101 can capture an image of an object in various compositions by PTZ movement. The camera 103 is a wide-angle camera for capturing a wide-angle video (hereafter, wide-view video). The camera 103 captures a wide range including a plurality of registered preset areas and the entire moving range of the angle of view of the PTZ camera 101. The information processing apparatus 104 obtains object information representing a position and a size of an object from the wide-view video captured by the camera 103. The videos captured by the PTZ camera 101 and the camera 103 may be recorded in a storage apparatus (not illustrated) connected to the network 102. A configuration may be taken such that the information processing apparatus 104 connected to the camera 103 via the network 102 crops a portion of a video captured by the camera 103 and performs video processing for electronically reproducing image capturing of the angle of view according to the PTZ value. In this case, the PTZ camera 101 may be omitted. Further, the video to be cropped may be a video captured by a camera provided separately from the camera 103.

The information processing apparatus 104 is, for example, a camera controller, a personal computer, a smartphone, a tablet terminal apparatus, or the like. The switching of presets may be performed by a user operation or may be performed automatically by programming a preset tour in the information processing apparatus 104 or the PTZ camera 101. FIG. 1 illustrates main components to be referred to in the following description regarding the video production system 10 of the present embodiment. Therefore, the video production system 10 may include other apparatuses in addition to the illustrated components.

Figure 2:
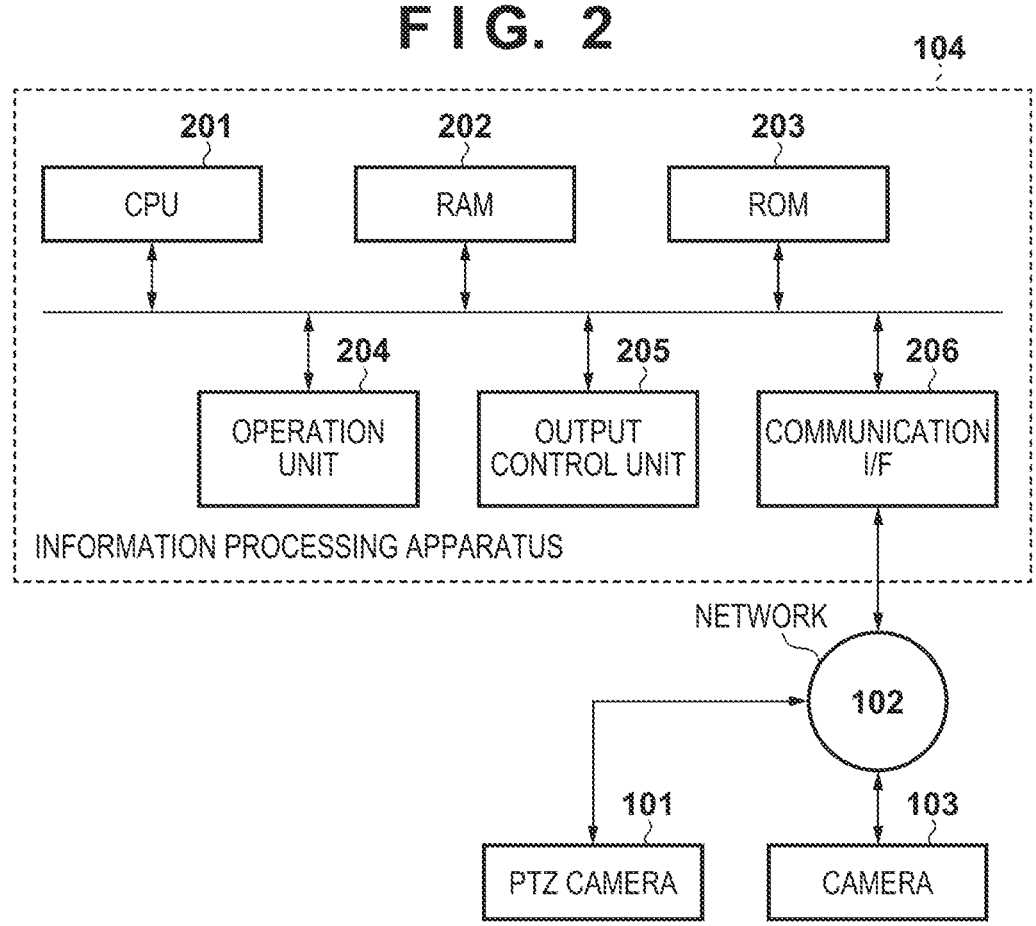
FIG. 2 is a block diagram illustrating an example of a hardware configuration of an information processing apparatus according to the first embodiment.

FIG. 2 is a block diagram illustrating an example of a hardware configuration of the information processing apparatus 104. The information processing apparatus 104 includes a CPU 201, a RAM 202, a ROM 203, an operation unit 204, an output control unit 205, and a communication I/F 206. In FIG. 2, it is assumed that the information processing apparatus 104, the PTZ camera 101, and the camera 103 are connected to the network 102 (e.g., a local area network (LAN)). The present disclosure, however is not limited to this. There are various forms of the network connecting between the respective apparatuses, and the form is not limited to a specific form.

The CPU 201 operates based on a program loaded into the RAM 202 or a program stored in the ROM 203, and performs control of the entire information processing apparatus 104. The random access memory (RAM) 202 is a volatile memory that can read and write data as appropriate. The read only memory (ROM) 203 is a read only memory. The ROM 203 stores a boot program to be executed by the CPU 201 at the start of the information processing apparatus, a command program for executing operations of the information processing apparatus, data to be used by such programs, and the like. The CPU 201 executes a program loaded into the RAM 202 from the ROM 203, but is not limited to this. For example, a configuration may be taken so as to obtain a program from another apparatus via the communication I/F 206 and execute the program by the CPU 201.

The CPU 201 obtains data (data according to a user operation) from an input apparatus, such as a keyboard and a mouse, a camera controller, or a camera switcher, via the operation unit 204. The CPU 201 outputs generated data to an output apparatus, such as a display, via the output control unit 205. The communication I/F 206 receives data from other apparatuses (such as the PTZ camera 101 and the camera 103) via the network 102 and transmits the data to the CPU 201. The communication I/F 206 also transmits data generated by the CPU 201 to other apparatuses via the network 102. In addition, the RAM 202 stores a video captured by the PTZ camera 101 obtained from the network 102 via the communication I/F 206, a wide-view video captured by the camera 103, and the like.

Figure 3:
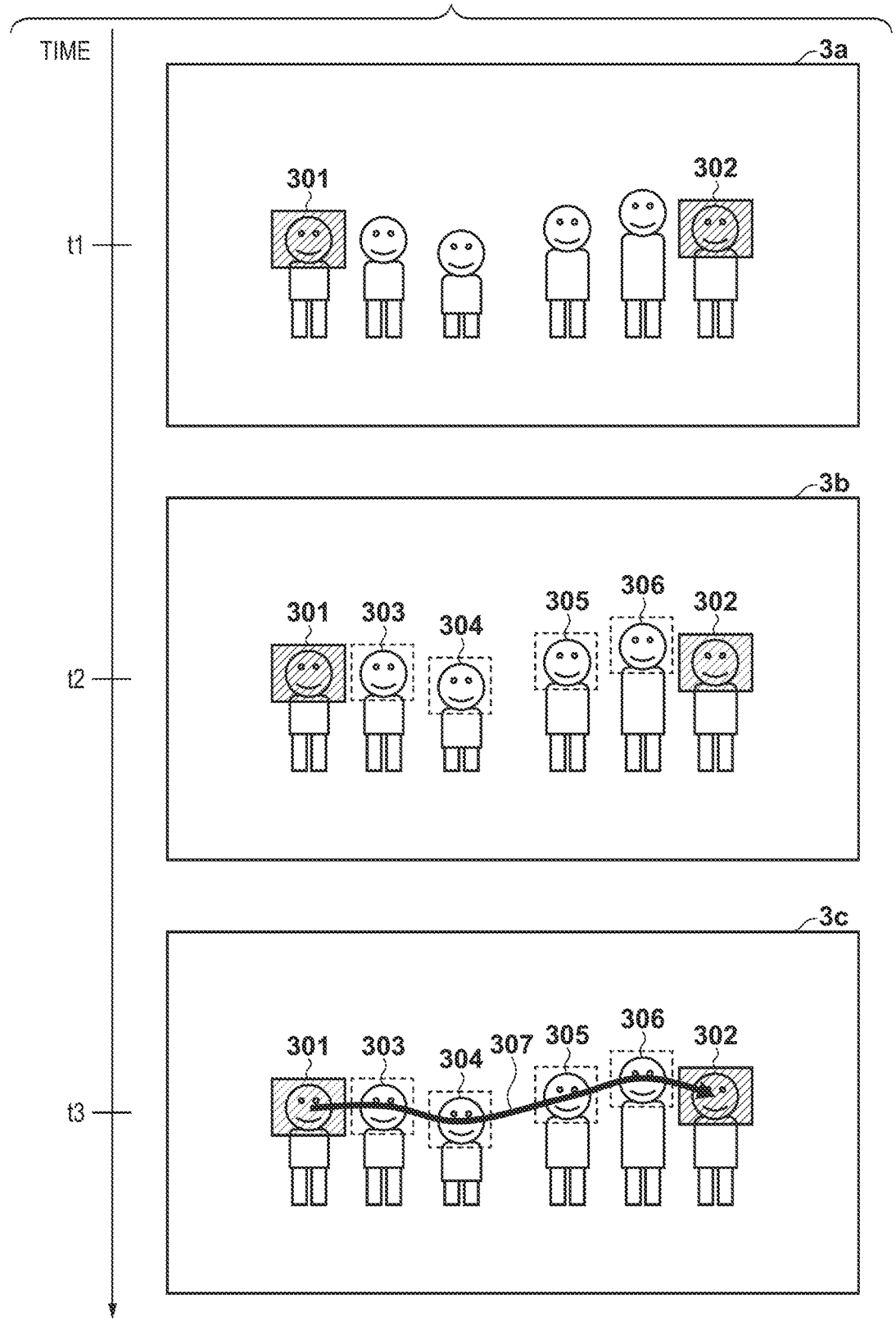
FIG. 3 is a conceptual diagram illustrating an operation of switching of image capturing areas according to the first embodiment.

An overview of movement of an image capturing area, in which object tracing is to be performed according to the first embodiment, will be described with reference to FIG. 3. FIG. 3 illustrates a processing status that changes over time using wide-view videos 3a, 3b, and 3c at time t1, time t2, and time t3. The wide-view videos 3a to 3c are each captured by camera 103. In the present embodiment, a preset A, in which an image capturing area 301 for capturing an image of a particular person is set, and a preset B, in which an image capturing area 302 for capturing an image of a person other than that of the preset A is set, are registered in the PTZ camera 101. The association of the preset and the image capturing area will be described later.

At time t1, the PTZ camera 101 is capturing an image of the image capturing area 301. That is, at this point in time, the preset A is designated (out of the registered preset A and the preset B), and the angle of view (PTZ) of the PTZ camera 101 is set so as to capture an image of the image capturing area 301 of the preset A. In FIG. 3, the image capturing areas 301 and 302 corresponding to the preset A and the preset B are indicated in the wide-view video 3a of time t1. Assume that, in this state, the operator designates a person's face as the type of object by using the information processing apparatus 104.

In response to the type of object being designated as a person's face, the information processing apparatus 104 detects objects 303 to 306, which are people's faces, from the wide-view video 3b obtained by the camera 103 as illustrated in the wide-view video 3b of time t2. In FIG. 3, broken-line rectangular frames (detection frames) surrounding each of the detected objects are illustrated in the wide-view video 3b. The information processing apparatus 104 obtains sizes and positions of detected objects (rectangular frames) from the wide-view video, and stores the sizes and positions of detected objects in a memory (e.g., the RAM 202) as object information. The object information (sizes and positions of objects) to be obtained from the wide-view video 3b will be described later. The detection of objects may be performed by the camera 103. The obtainment of sizes and positions of objects may be performed in the camera 103.

At time t3, an instruction for switching the angle of view (image capturing area) of the PTZ camera 101 from the image capturing area 301 to the image capturing area 302 is performed by the operator designating the preset B. In response to this instruction for switching, the information processing apparatus 104 generates a moving path of the image capturing area that moves from the image capturing area 301 to the image capturing area 302 so as to include capturing of an image of the objects 303 to 306, which have been detected from the wide-view video. A generated moving path 307 is illustrated in the wide-view video 3c. The movement of the image capturing area that includes capturing of an image of objects means, for example, that the image capturing area moves so as to pass through the objects. Here, the image capturing area passing through the objects means, for example, that the center of the image capturing area passes through the objects. However, the present disclosure is not limited to this, and, for example, the image capturing area may move so that the objects sequentially enter somewhere in the image capturing area, or the image capturing area may move so that the objects enter to a set predetermined range within the image capturing area. The PTZ camera 101 performs PTZ movement so that the angle of view moves from the image capturing area 301 to the image capturing area 302 based on the generated moving path 307. The information processing apparatus 104 tracks each of the objects 303 to 306 in the wide-view video and may update the moving path of the image capturing area as appropriate in accordance with the movement of the objects 303 to 306 while the image capturing area moves.

Figures 4A, 4B, 4C:
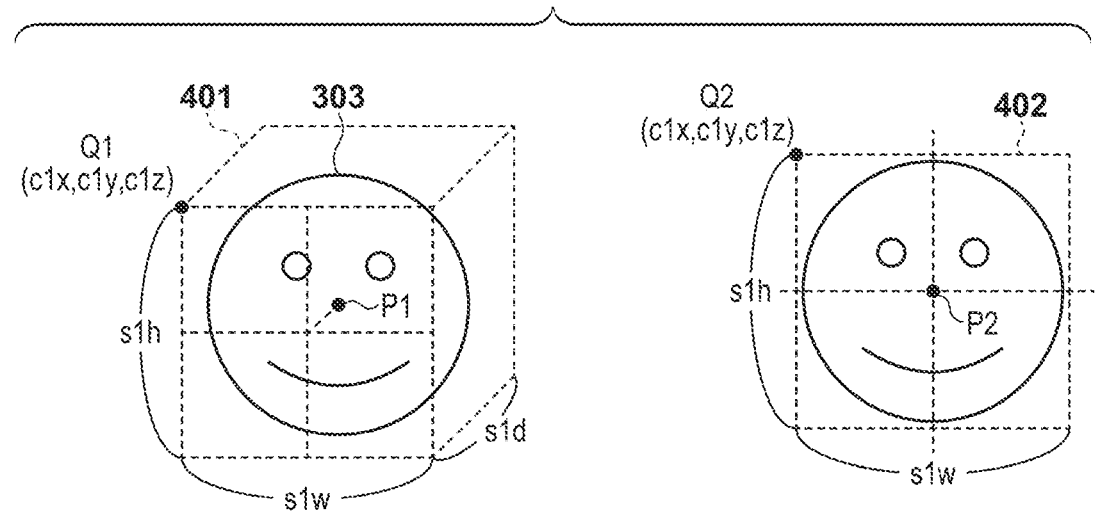
FIG. 4A is a diagram illustrating an example of preset information.
FIGS. 4B and 4C are diagrams for explaining information of a position and size of an object.

FIG. 4A is a diagram illustrating an example of a data configuration of preset information for registration of a preset. The preset information is information that associates a preset ID with an image capturing area (PTZ coordinates). The preset ID is identification information that can uniquely identify a respective preset. In addition, the PTZ coordinates are information representing an image capturing area and are configured by a pan angle p, a tilt angle t, and a zoom scaling factor z of the PTZ camera 101. The position of the image capturing area (angle of view) is determined by the pan angle p and the tilt angle t, and the size of the image capturing area (angle of view) is determined by the zoom scaling factor z. When there are a plurality of cameras (e.g., the PTZ camera 101 and the camera 103) as illustrated in FIG. 1, by converting the coordinates of image capturing areas into world coordinates that are in common among the plurality of cameras, it becomes possible to handle image capturing areas using the same coordinates among the plurality of cameras.

Next, object information of objects detected from a video will be described with reference to FIG. 4B and FIG. 4C. FIG. 4B illustrates an example of object information that is stored for path generation when objects have been detected in a video. The object information includes an object ID, three-dimensional coordinates indicating a position of a detected object, and size information indicating a size of the detected object. The object ID is identification information for uniquely identifying a respective object. Here, for example, an object ID of an object 303 is set to one. The three-dimensional coordinates are position information representing a position of an object with three-dimensional coordinates of a world coordinate system. The size information expresses a size of an object by lengths of a height, a width, and a depth of a cuboid encompassing the object.

FIG. 4C is a diagram for explaining an example of three-dimensional coordinates and size information of an object. FIG. 4C illustrates examples of three-dimensional coordinates and size information for when the object 303 has been detected. The three-dimensional coordinates indicating a position at which the object 303 is present may be coordinates P1 of a center position of a cuboid 401 surrounding the entire object 303 or coordinates of one (e.g., a vertex Q1) of eight vertices of the cuboid 401. As a size of the object 303, lengths of three adjacent sides constituting the cuboid 401 surrounding the object 303, for example, may be used. As the size of the object 303, lengths of two sides (a two-dimensional size (s1h, s1w)) of a rectangle 402 surrounding an image of the object 303 captured in the wide-view video may be used. In this case, a position of an object indicated by three-dimensional coordinates may be, for example, the center of the rectangle 402 or one (e.g., a vertex Q2) of the four vertices of the rectangle 402. Further, a well-known method can be used for a method of obtaining three-dimensional coordinates of an object from the wide-view video of the camera 103. For example, a method of calculating three-dimensional coordinates of an object based on a marker installed in advance, a method of calculating three-dimensional coordinates of an object from a shape of a blur of a video, and the like, are known. By converting three-dimensional coordinates and a size of an object into world coordinates, the camera 103 and the PTZ camera 101 share the coordinates of the object. Three-dimensional coordinates and a size of an object may be obtained by stereoscopic image capturing with two cameras 103.

Figure 5:
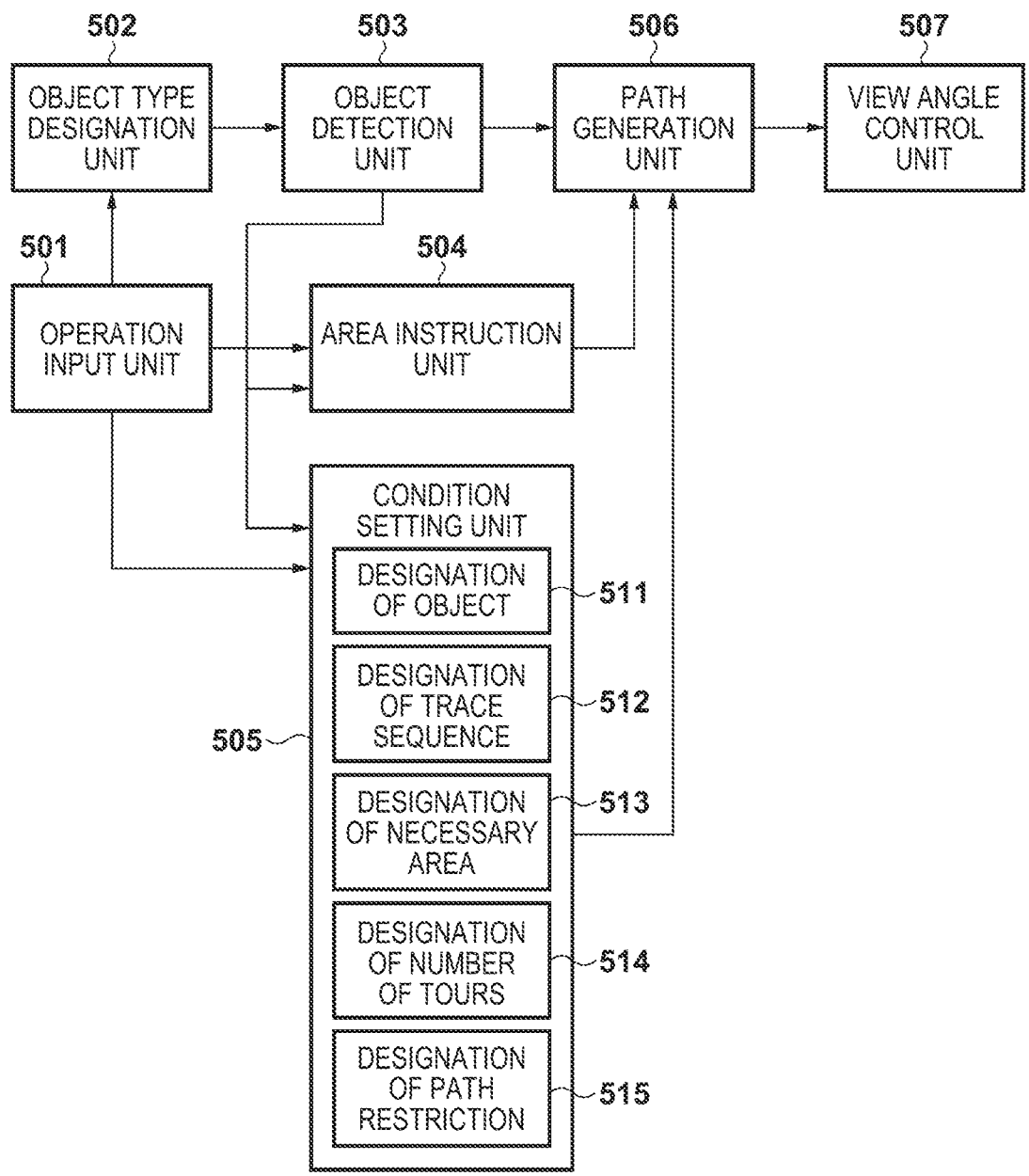
FIG. 5 is a block diagram illustrating an example of a functional configuration of the information processing apparatus according to the first embodiment.

FIG. 5 is a block diagram illustrating an example of a functional configuration of the information processing apparatus 104. Each functional unit illustrated in FIG. 5 may be implemented by the CPU 201 executing a computer program stored in the ROM 203 or a computer program loaded into the RAM 202. However, each functional unit illustrated in FIG. 5 may be realized by dedicated hardware or may be realized by cooperation of dedicated hardware and a program (the CPU 201).

An operation input unit 501 inputs information corresponding to a user operation from the operation unit 204. The operation input unit 501 provides, for example, a user interface, as will be described below in FIGS. 8A to 8C to the operation unit 204, and inputs information designated via that user interface. A type designation unit 502 sets a type of object to be detected by an object detection unit 503 in accordance with designation of an object inputted by the operation input unit 501. The object detection unit 503 detects an object of designated type from the wide-view video obtained from the camera 103. Object information of a detected object is stored in a memory in a form as described in FIG. 4B. An area instruction unit 504 generates preset information, as described in FIG. 4A, in accordance with the operation information received by the operation input unit 501 and registers the preset. The area instruction unit 504 performs an instruction of a movement origin preset and an instruction of a movement destination preset (an instruction for switching image capturing areas), and the like, in accordance with the operation information from the operation input unit 501. A condition setting unit 505 sets various conditions to be applied when generating a moving path of the image capturing area in accordance with the operation information from the operation input unit 501. In the present embodiment, the condition setting unit 505 can set conditions according to designation of object 511, designation of trace sequence 512, designation of necessary area 513, designation of number of tours 514, and designation of path restriction 515. Details on each condition setting will be described later.

A path generation unit 506 uses conditions set by the condition setting unit 505 to generate movement information including a moving path of the image capturing area from the movement origin preset to the movement destination preset instructed by the area instruction unit 504. A view angle control unit 507 controls the angle of view (PTZ) of the PTZ camera 101 so as to move the image capturing area in accordance with the moving path generated by the path generation unit 506.

FIG. 6 is a flowchart illustrating processing (processing for determining a moving path of an image capturing area, hereafter, moving path generation processing) to be performed by the information processing apparatus 104 having the functional configuration illustrated in FIG. 5. In step S601, the operation input unit 501 waits until information of an operator operation is inputted from the operation unit 204. In step S602, the operation input unit 501 provides operation information that accords with the operator operation to respective functional units. The following describes processing (step S603 to step S612) that accords with the operation information.

If the operation information designates a movement origin preset (initial preset) from among the registered presets, the area instruction unit 504 instructs the view angle control unit 507 to move the image capturing area (angle of view) of the PTZ camera 101 to the designated preset. The view angle control unit 507 moves the angle of view (PTZ) of the PTZ camera 101 to the designated image capturing area along a moving path generated by the path generation unit 506 (step S603).

If the operation information indicates designation of a type of object, the type designation unit 502 sets the type of object designated by a user operation to the operation unit 204 as a target of detection processing in the object detection unit 503. The object detection unit 503 detects an object of the type set by the type designation unit 502 from a wide-view video obtained from the camera 103 (step S604). The object detection unit 503 obtains a size and position coordinates of the detected object, generates object information, and stores the object information as described in FIG. 4B. In the following, a description will be given assuming that a person's face is set as the type of object. Of course, however, the type of object to be set does not necessarily have to be a face, and the type of object is not limited in any way. Well-known techniques, such as general object recognition, can be used for a method of detecting an object using a video. In the present embodiment, an object to be detected is not limited to a person or a part of a human body, and any type of object may be used as long as the object can be recognized from a video.

If the operation information indicates selection of an object to be traced, the condition setting unit 505 performs the designation of object 511 (step S605). The object to be traced is an object to be captured while the image capturing area moves along the moving path among the objects detected by the object detection unit 503. The designation of object 511 selects from the detected objects an object to be traced in the movement of the image capturing area. The moving path generated in the path generation unit 506 is thus restricted so as to trace the object selected by the designation of object 511. All of the objects included in the wide-view video may be a trace target. If an object to be traced is not selected by a user operation, for example, all of the objects included in the wide-view video will be trace targets. In addition, selection of an object to be traced is performed by, for example, a user operation that selects an object from a display of the wide-view video (details will be described later).

If the operation information is designation of a trace sequence of objects in the moving path of the image capturing area, the condition setting unit 505 performs the designation of trace sequence 512 (step S606). The designation of trace sequence 512 designates a trace sequence of the objects detected by the object detection unit 503 in step S604 (an order of objects captured by moving the image capturing area). If a trace sequence of objects is not designated by the user, for example, the designation of trace sequence 512 may be determined so as to trace all of the objects to be traced in an order in which a distance of PTZ movement is the shortest. By designating the sequence in which objects to be traced are traced, a restriction can be set for generation of the moving path of the image capturing area.

If the operation information indicates setting of an image capturing area to always be passed when generating a moving path, the condition setting unit 505 executes the designation of necessary area (step S607). The designation of necessary area designates, for example, a preset image capturing area to always be included in the moving path of the image capturing area as a necessary image capturing area in the path generation unit 506 among the registered presets. The necessary image capturing area is represented by, for example, PTZ coordinates. By designating a necessary image capturing area, a restriction can be set for generation of the moving path.

If the operation information indicates designation of the number of tours of presets, the condition setting unit 505 executes the designation of number of tours 514 (step S608). A preset tour is a moving path (hereafter, a traveling path) along which the image capturing area goes back and forth between two designated presets. The designation of number of tours 514 designates the number of tours designated by the operation information to the path generation unit 506. The number of tours is designated by an integer of 0 or more. If zero is designated as the number of tours, the preset tour is not executed. Further, the designation of number of tours 514 may be determined based on an image capturing period determined by the operator and an amount of time required for PTZ movement between the movement origin and movement destination presets, and the number of preset tours.

If the operation information indicates designation of path restriction at the time of a plurality of tours, the condition setting unit 505 executes the designation of path restriction 515 (step S609). The designation of path restriction 515 instructs the path generation unit 506 so that if a plurality of tours is designated by the designation of number of tours 514, the moving paths of respective tours are not the same paths. Thus, it is possible to set a restriction for the moving path to be generated. For example, if a path restriction is instructed by the operation information in a state in which the number of tours is designated to two times by the designation of number of tours 514, the designation of path restriction 515 notifies the path generation unit 506 of this. The path generation unit 506 generates two different traveling paths and generates a moving path so as to move the image capturing area using different traveling paths in first and second tours.

If the operation information instructs switching of presets, the area instruction unit 504 instructs the path generation unit 506 to change the image capturing area to the movement destination preset (image capturing area) (step S610). As described in FIG. 4A, the movement destination preset is represented, for example, by PTZ. The path generation unit 506 that has received the instruction for changing the image capturing area to the movement destination preset generates a moving path of the image capturing area to the movement destination preset using conditions set in the respective processes described above from steps S605 to S609 (step S611). A method of generating the moving path will be described later. The view angle control unit 507 controls the PTZ movement of the PTZ camera 101 in accordance with the moving path of the image capturing area generated in step S611 (step S612).

The method of generating a moving path by the path generation unit 506 will be described with reference to FIGS. 7A to 7G. FIGS. 7A to 7G are diagrams illustrating examples of conditions set by the above-described steps S605 to S609 and a moving path generated by the path generation unit 506 in accordance with the set conditions. FIGS. 7A to 7G illustrate moving paths.

In the examples illustrated in FIGS. 7A to 7G, there are faces of twelve people from an object 701 to an object 712. In addition, an image capturing area 715 and an image capturing area 716 are registered as presets. The image capturing area 715 is designated as the movement origin preset, and the PTZ of the PTZ camera 101 is controlled so as to capture an image of the image capturing area 715. It is assumed that the object ID is set to be the same as the reference numerals (701 to 712) indicating the objects.

Figure 7A:
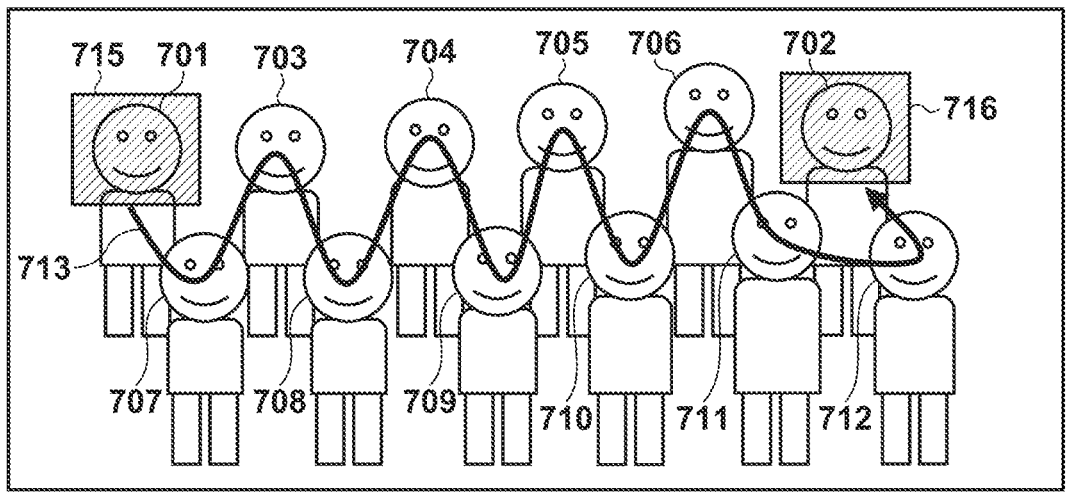
FIGS. 7A to 7G are diagrams illustrating examples for generation of a moving path.

FIG. 7A is an example of a moving path to be generated when the trace sequence of objects is designated by the designation of trace sequence 512. In the example of FIG. 7A, the trace sequence has been designated so as to capture images in a sequence in order of the object 707, the object 703, the object 708, the object 704, the object 709, the object 705, the object 710, the object 706, the object 711, and the object 712. Since the object 701 and the object 702 are included in a start point preset (image capturing area 715) and an end point preset (image capturing area 716) of the moving path, even if they are designated as trace targets by the operation information, they are not treated as objects to be traced at the time of generating the moving path. The path generation unit 506 generates a moving path 713 of the image capturing area so as to sequentially capture an image (trace) the objects in accordance with the trace sequence designated by the operator. The trace sequence may be designated for some of the objects to be traced. When the trace sequence is designated for some of the objects, a first moving path along which the trace sequence is traced in the designated sequence for the designated group of objects is generated. For other objects, for example, a second moving path is generated so as to trace the objects in order of closeness to the image capturing area 715, which is the movement origin, and by connecting the first moving path and the second moving path, a moving path from the image capturing area 715 to the image capturing area 716 is generated. The movement of the angle of view along the moving path can be realized by the control of panning and tilting of the PTZ camera 101. Further, the zooming of the angle of view may be controlled based on a detected size of an object to be traced. For example, when capturing an image of an object to be traced, the zooming may be controlled so that a proportion of the entire image capturing area that an intra-video size of the object occupies will be a predetermined value.

Figure 7B:
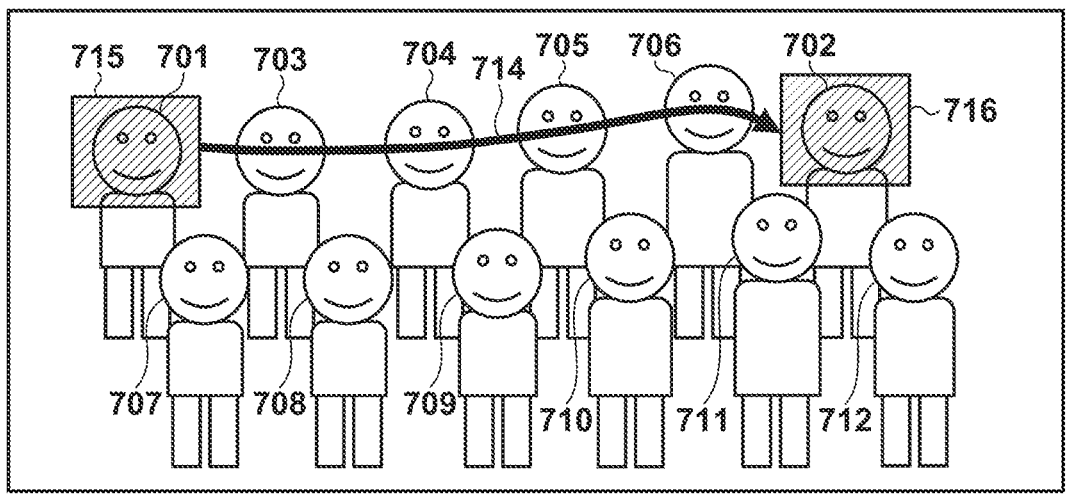

FIG. 7B is an example of a moving path generated when objects (objects to be traced) to be included in the moving path of the image capturing area are designated by the designation of object 511. In the example of FIG. 7B, it is assumed that the object 703, the object 704, the object 705, and the object 706 are designated as the objects to be included in the moving path by the designation of object 511. The path generation unit 506 generates a moving path 714 so as to include the objects selected by the user in the path. A configuration may be taken so as to allow selection of an object that the user does not want to be traced. In that case, the path generation unit 506 generates a moving path so that the image capturing area does not include an area where there is the object selected by the user. When a trace sequence is designated for the selected objects, a moving path is generated so as to capture an image of the objects in the designated trace sequence.

Figure 7C:
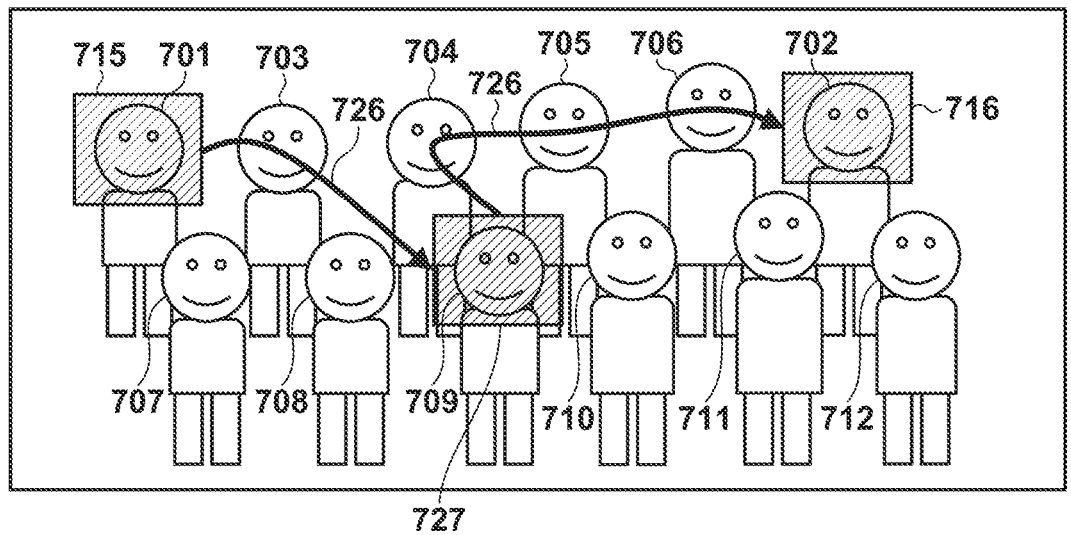
Figure 7D:
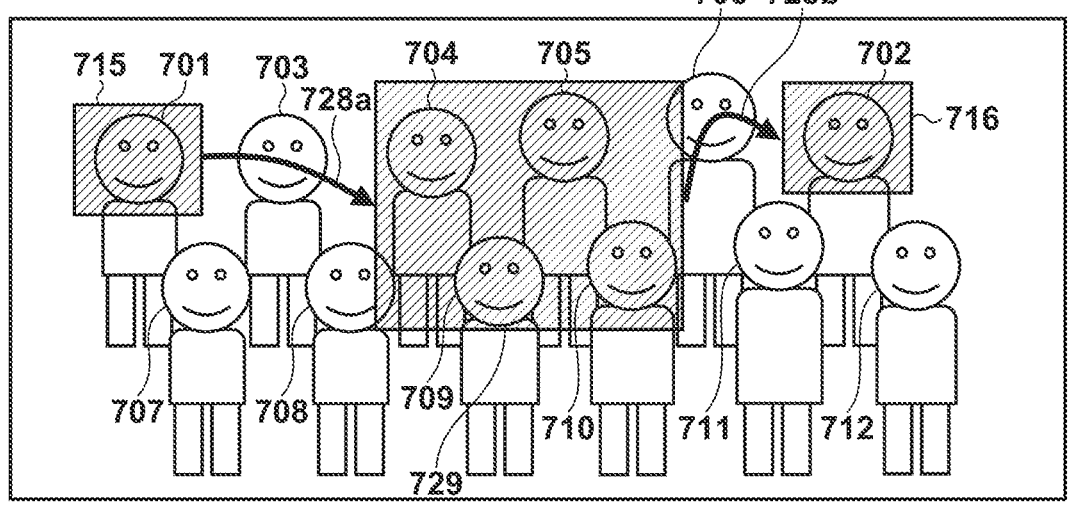

FIGS. 7C and 7D are examples of moving paths generated by the path generation unit 506 when a necessary image capturing area (preset) is designated by the designation of necessary area. In FIGS. 7C and 7D, it is assumed that the object 703, the object 704, the object 705, and the object 706 are designated as trace targets by the designation of object 511. In FIG. 7C, it is assumed that among presets registered in advance, an image capturing area 727 is designated by the user as a necessary image capturing area. In that case, the path generation unit 506 generates a moving path 726 so that the image capturing area includes the image capturing area 727, which is the designated necessary image capturing area, in the path, that is, so that the image capturing area passes through the image capturing area 727. Since the object 709 is included in the image capturing area 727, which is the necessary image capturing area, the object 709 may be traced when the image capturing area passes through the image capturing area 727. Therefore, a configuration may be taken so as not to treat the object 709 as a trace target at the time of generating the moving path even if the object 709 is designated as a trace target according to the operation information.

Further, FIG. 7D illustrates a case in which an image capturing area 729, including a plurality of objects 704 and 705 to be traced, is set as a necessary image capturing area, for example. As described above, the objects to be traced included in the necessary image capturing area may be excluded from the objects to be traced at the time of generating the moving path. In the case of FIG. 7D, the object 704 and the object 705 are excluded from trace targets at the time of generating the moving path even if they are designated as trace targets according to the operation information. Accordingly, as a result, the path generation unit 506 generates moving paths 728a and 728b, for example. As illustrated in FIG. 7D, when a size of the necessary image capturing area (image capturing area 729) differs from that of the image capturing area 715, a size of the image capturing area is controlled by a zoom value (z) of the PTZ camera 101. A timing at which to change the size of the image capturing area is not particularly limited. For example, the size of the moving image capturing area may be gradually changed from a size of the image capturing area 715 to a size of the image capturing area 729 during the movement along the moving path 728a and may be gradually changed from the size of the image capturing area 729 to a size of the image capturing area 716 during the movement along the moving path 728b. Alternatively, for example, a configuration may be taken so as to stop the movement of the currently moving image capturing area when the currently moving image capturing area arrives at the center of the image capturing area 729, to change the size of the currently moving image capturing area to the size of the image capturing area 729, and to resume the movement after changing the size of the currently moving image capturing area to the size of the image capturing area 716. Further, as described in FIG. 7D, a plurality of objects included in the image capturing area 729, which is the necessary image capturing area, may be regarded as traced by the image capturing area passing through the image capturing area 729. Therefore, a configuration may be taken so as not to treat the plurality of objects in the image capturing area 729 as trace targets at the time of generating the moving path even if these objects are designated as trace targets according to the operation information.

Figure 7E:
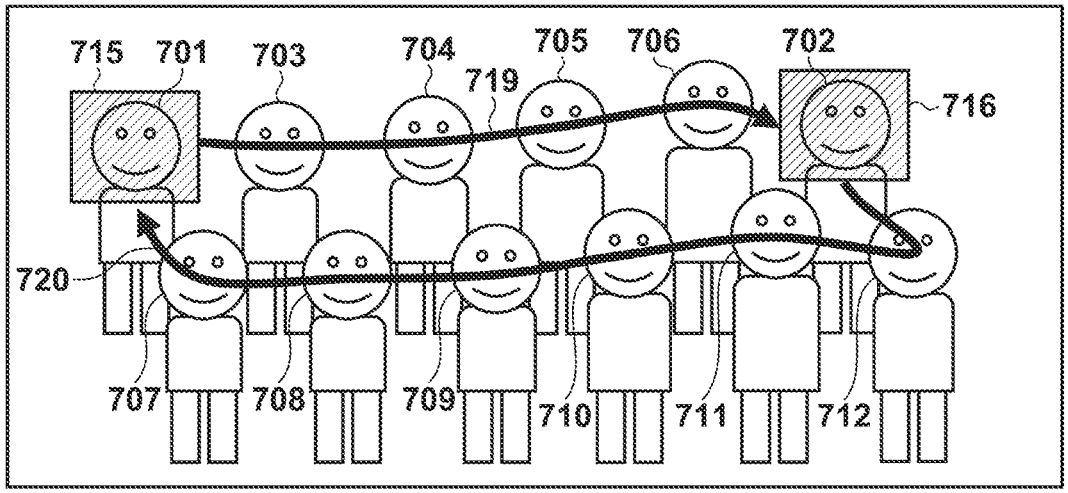

FIG. 7E illustrates an example of a traveling path to be generated when the number of tours is designated as one by the designation of number of tours 514. If the number of tours is designated as one or more, then touring image capturing is performed for the designated number of tours. All of the objects designated by the designation of object 511 may be traced by the designated number of tours. For example, in FIG. 7E, all of the objects are designated as trace targets, a moving path 719 is a path along which the image capturing area moves for an outbound path, and a moving path 720 is a path along which the image capturing area moves for a return path. Different moving paths may be generated between the outbound path and the return path, so as to cover all of the objects by the outbound path and the return path of the traveling path.

Figure 7F:
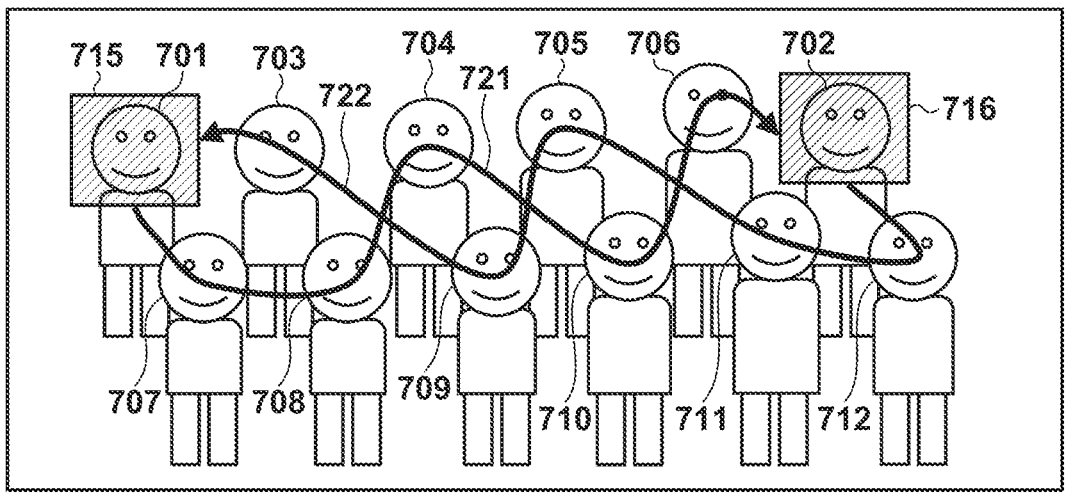

FIG. 7F illustrates an example of a traveling path to be generated when a restriction that a moving path varies for each tour is set by the designation of path restriction 515. In FIG. 7F, when the number of tours is set to two by the designation of number of tours 514, assuming that the image capturing area has moved along the outbound path (moving path 719) and return path (moving path 720) illustrated in FIG. 7E in a first tour, the image capturing area needs to pass through a different route in a second tour. For this reason, the path generation unit 506 generates a traveling path (a moving path 721, and a moving path 722) that includes all of the objects that have been a trace target in the first tour (FIG. 7E), and differs from that of the first tour for a second tour. In FIGS. 7E and 7F, a configuration is taken so as to trace all of the objects to be traced in each tour. The present disclosure, however, is not limited to this. A configuration may be taken so as to complete tracing of all of the objects to be traced in a designated number of tours.

Figure 7G:
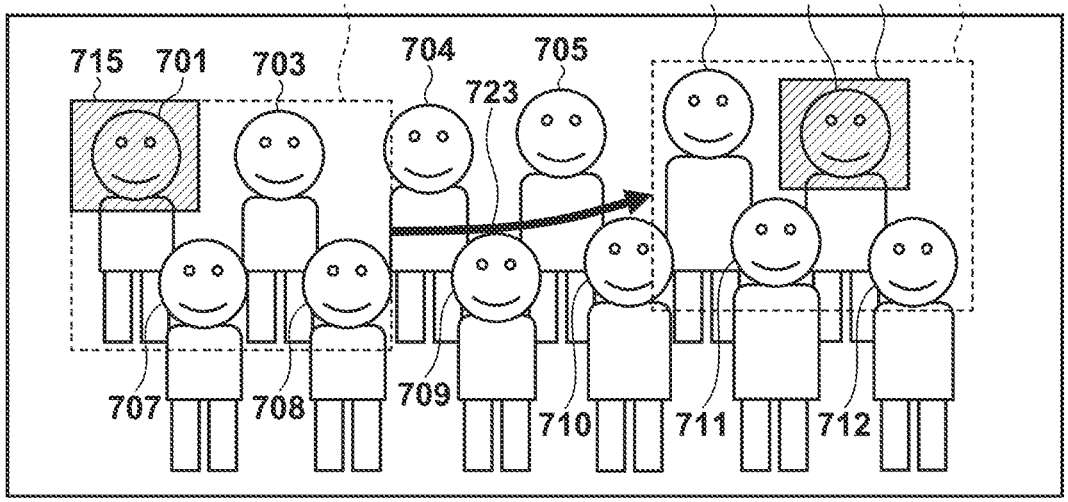

FIG. 7G is an example of controlling the zoom scaling factor in order to cover all objects. For example, when generating a path that covers all of the detected objects, an amount of PTZ movement increases, making it difficult to obtain a video that is suitable for viewing. Therefore, a configuration may be taken so as to reduce an amount of change in the intra-PTZ-movement pan angle and tilt angle for when the image capturing area is being moved by lowering the zoom scaling factor (widening the image capturing area) to allow a plurality of objects to be included in one angle of view. By generating a moving path 723 along which an enlarged image capturing area 724 moves, it is possible to reduce the amount of PTZ movement while covering the objects to be traced. After the image capturing area has been enlarged to the image capturing area 724, the image capturing area moves along the moving path 723 until all of the objects to be traced enters the moving image capturing area. As a result, the image capturing area moves to an image capturing area 725, and, thereafter, the size of the image capturing area returns to an original size (a pre-enlargement size).

When generating a moving path, the information processing apparatus 104 may include designation of a PTZ speed for the PTZ camera 101. That is, movement information to be generated by the path generation unit 506 may include a speed (PTZ speed) for when the image capturing area moves along the moving path. For example, the path generation unit 506 sets a speed of the image capturing area based on a positional relationship between the image capturing area, which moves along the moving path, and an object. For example, when the angle of view of the PTZ camera 101 includes an area to be traced (an object and a necessary image capturing area) or when the angle of view approaches the area to be traced, the information processing apparatus 104 designates the PTZ speed so as to decelerate a pan and the tilt speed. Meanwhile, in a state in which the area to be traced is not included in the angle of view of the PTZ camera 101, the information processing apparatus 104 designates the PTZ speed so as to accelerate the pan and tilt speed. In addition, the user may arbitrarily define a pan, a tilt, and a zoom speed, an area in which acceleration or deceleration is performed, and a restriction on the zoom value.

As a method of covering objects to be traced, the moving path may be generated as follows. For example, as illustrated in FIG. 7A, when movement is made from an image capturing area, which is a start point, to an image capturing area, which is an end point, in a pan direction, objects are covered in order of appearance. Alternatively, for example, as illustrated in FIG. 7B, objects that are included in a rectangle (the smallest rectangle including the image capturing area 715 and the image capturing area 716), in which an image capturing area, which is a start point, and an image capturing area, which is an end point, are set as edge points, are covered in a pan direction from the start point to the end point. In this case, the objects that are included in the rectangle are trace targets. Further, for example, as illustrated in FIG. 7E, when objects are covered separately in a plurality of paths, the objects to be traced are covered so that each path is in a single stroke and respective paths do not intersect. Alternatively, as illustrated in FIG. 7F, the objects to be traced are covered by allowing the respective paths to intersect.

A user interface for generating a moving path of an image capturing area according to the present embodiment will be described with reference to FIGS. 8A to 8F. FIGS. 8A to 8F illustrate examples of an operation screen of the information processing apparatus 104 for generating a moving path of an image capturing area and performing movement. In the examples of FIGS. 8A to 8F, the operation screen is a touch panel and is operated by the operator in accordance with a graphical user interface (GUI). However, a display and an operation method of the operation screen are not limited.

Figure 8A:
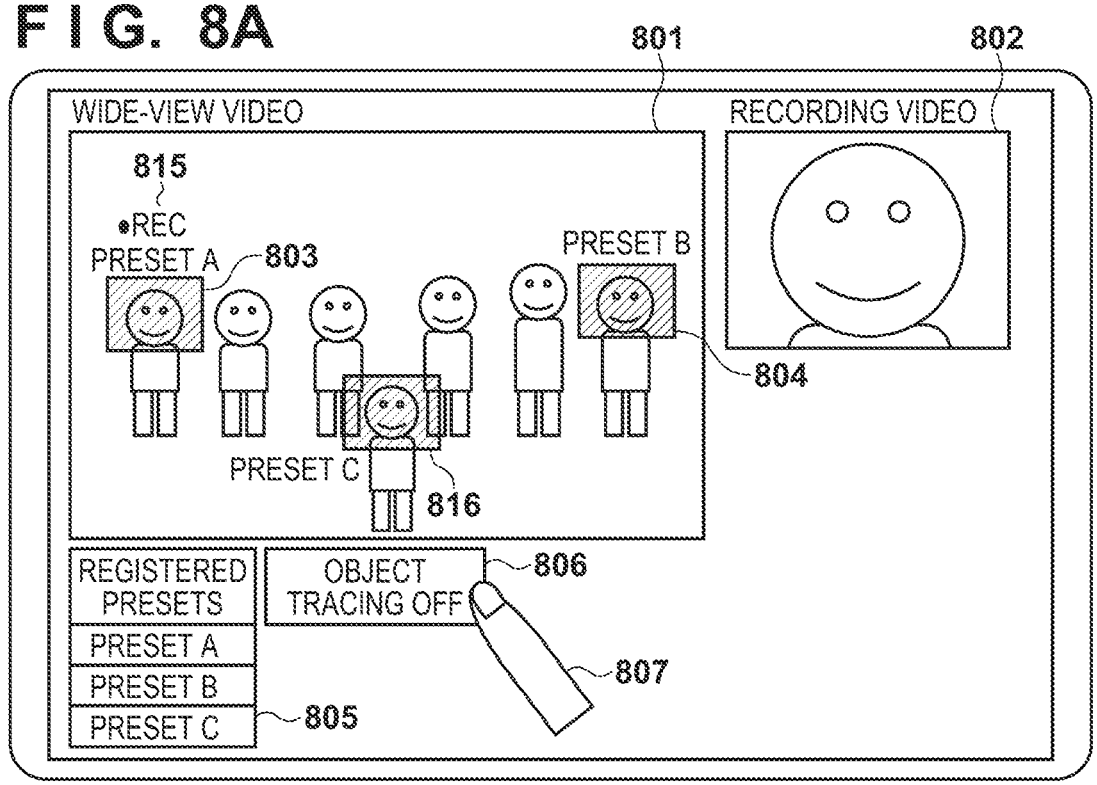
FIGS. 8A to 8F are diagrams illustrating examples of graphical user interfaces (GUIs) of the information processing apparatus.

In FIG. 8A, the wide-view video captured by the camera 103 is displayed in real time in a wide-view video display area 801, and the video captured by the PTZ camera 101 is displayed in real time in a captured video display area 802. In FIG. 8A an image capturing position indication 815 indicates that the preset A is being captured by the PTZ camera 101. For the PTZ camera 101, the preset A, for which an image capturing area 803 is set, the preset B for which an image capturing area 804 is set, and the preset C, for which an image capturing area 816 is set, are registered. The preset A, the preset B, and the preset C that have been registered in advance are displayed in a registered preset list 805. An object trace button 806 is a button for operating whether to generate a moving path by object tracing. In FIG. 8A, object tracing is in a disabled state (object tracing off). In this case, when the operator instructs switching of image capturing areas from the preset A to the preset B in a state of FIG. 8A, for example, PTZ movement that does not involve object tracing is performed. A finger 807 represents a finger of the user operating the information processing apparatus 104. When the object trace button 806 is pressed by the finger 807, object tracing is switched to enabled (object tracing on).

Figure 8B:
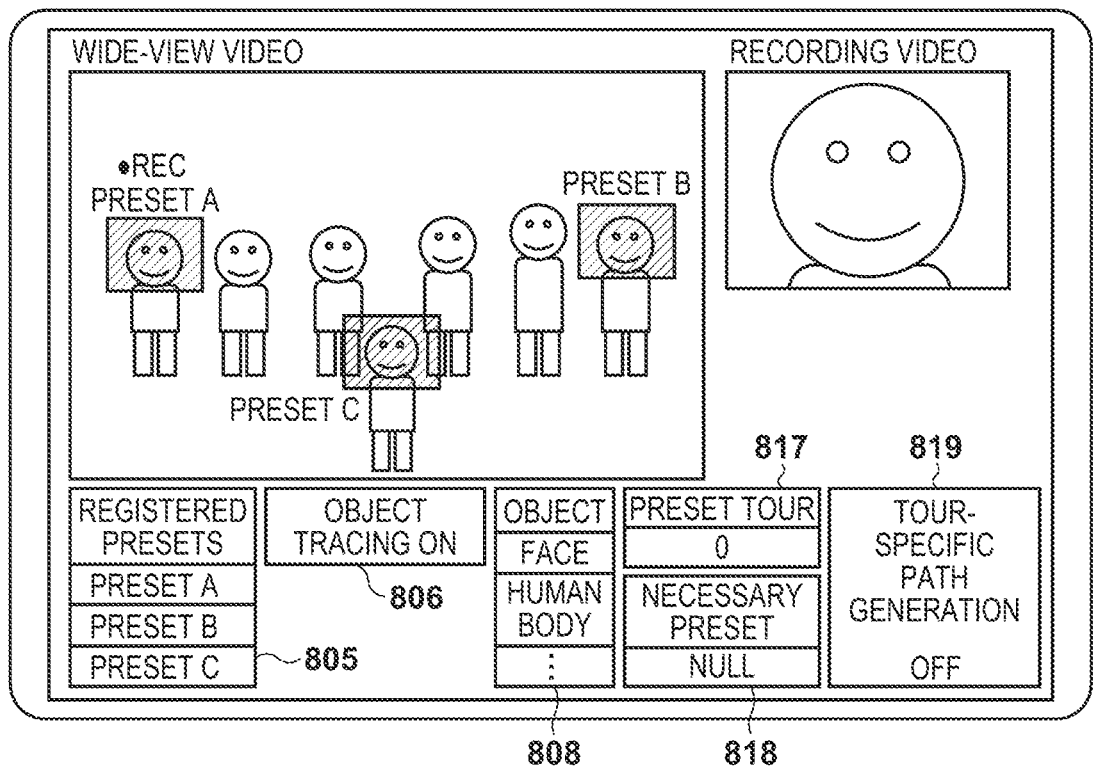

As illustrated in FIG. 8B, when object tracing is enabled, object type selection 808, a number of preset tours 817, a necessary preset 818, and a tour-specific path generation button 819 are displayed. The object type selection 808 is an example of the type designation unit 502, the number of preset tours 817 is an example of the designation of number of tours 514, a necessary preset 818 is an example of the designation of necessary area, and the tour-specific path generation button 819 is an example of the designation of path restriction 515. By operating the wide-view video display area 801 and each of the above-described display items, the user can set conditions (restrictions) for when generating the moving path of the image capturing area.

Figure 8C:
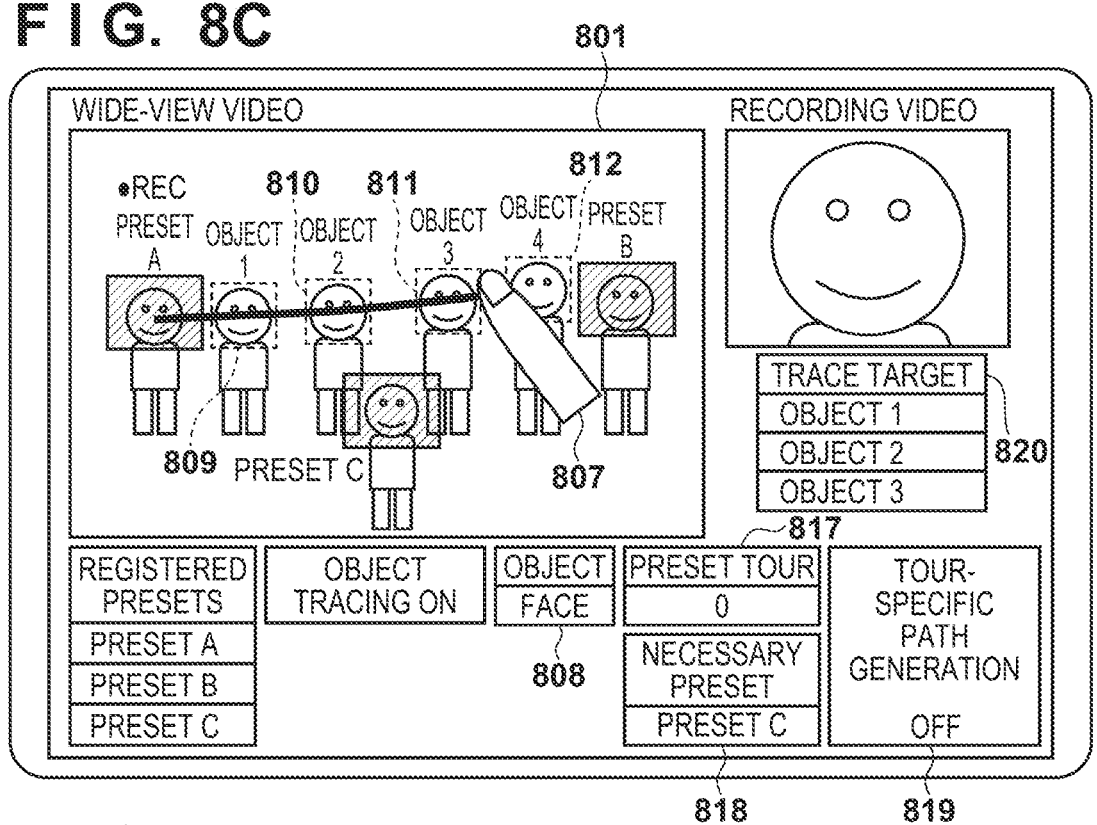

For example, assume that each item is set by the operator as illustrated in FIG. 8C. In FIG. 8C, the type of object to be traced is designated as a face in the object type selection 808, and the number of preset tours is designated as zero in the number of preset tours 817. In addition, the preset C is selected as the necessary image capturing area in the necessary preset 818. The tour-specific path generation button 819 is a button for designating the path restriction described in step S609 for when the number of tours is two or more. In FIG. 8C, since the number of tours is zero, it is designated not to set path restriction for generating another path.

In FIG. 8C, since a face is selected as the type of object, detection frames 809 to 812, indicating the positions of the faces detected from the wide-view video, are displayed in the wide-view video display area 801. In addition, the operator can select an object (object to be traced) to be included in the moving path of the image capturing area by touching with the finger 807 or sliding the finger 807 over the detection frame of the object displayed in the wide-view video display area 801. In the example illustrated in FIG. 8C, objects one to three are selected by a user operation, and the selected objects are listed in a trace target list 820. The designation of trace sequence 512 may use, for example, a sequence in which the objects have been selected by the sliding of the finger 807 or a sequence in which the objects have been selected by the touch operation of the finger 807, as a trace sequence. The designation of object 511 may be such that, for example, when a closed figure is drawn by the finger 807 by tracing, objects that are included within that closed figure are selected as objects to be traced.

Further, as a method of selecting an object to be traced, in addition to selecting each object with a finger, a pattern or a range for covering an object may be presented to the user and, from this, the user may perform designation. In this case, a configuration may be taken so as to present candidates for a plurality of types of patterns or ranges to the user, and to allow the user to arbitrarily perform selection from a plurality of presented candidates. In addition, when a plurality of moving paths of the image capturing area can be generated, the path generation unit 506 may display a plurality of paths of the image capturing path in an overlaid manner on the wide-view video display area 801, so that the operator can arbitrarily perform selection from the plurality of paths.

Figure 8D:
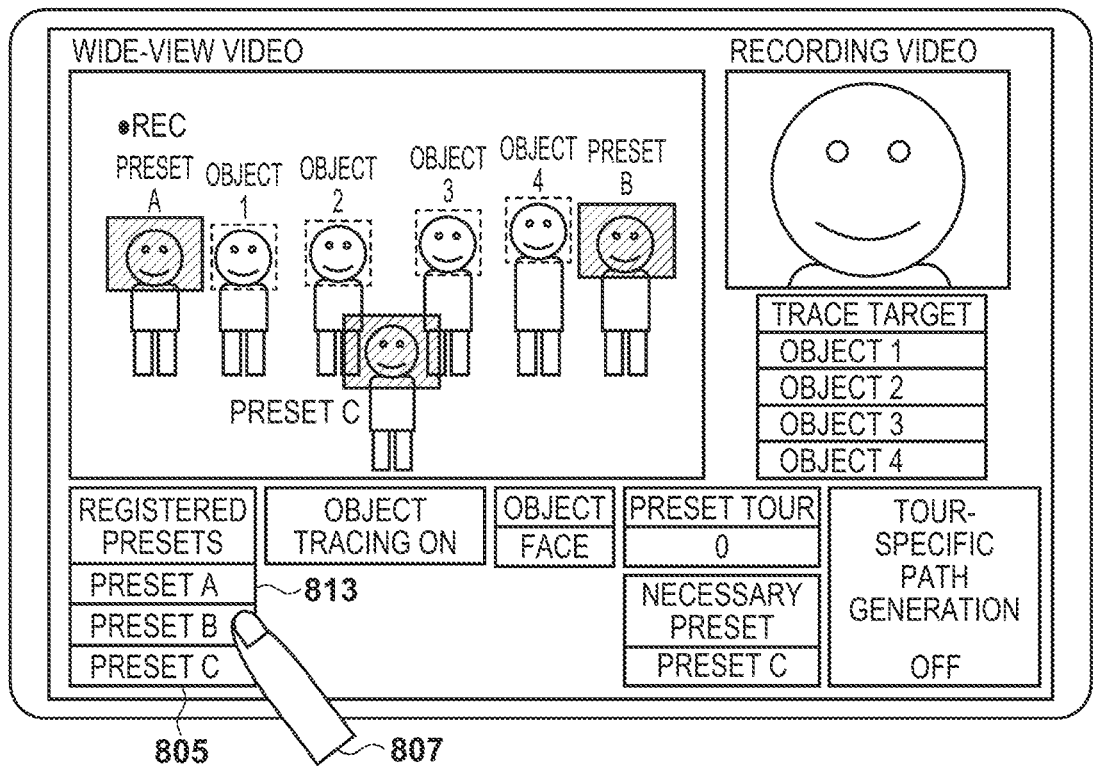

In FIG. 8D, preset switching is instructed by selecting any preset in the registered preset list 805. For example, when the user presses a button 813 corresponding to a switching target preset (preset B in this example) in the registered preset list 805, the moving path for moving the image capturing area from the preset A to the preset B is generated. The angle of view of the PTZ camera 101 is controlled so that the image capturing area moves along the generated moving path. The image capturing area is thus switched from the preset A to the preset B.

Figure 8E:
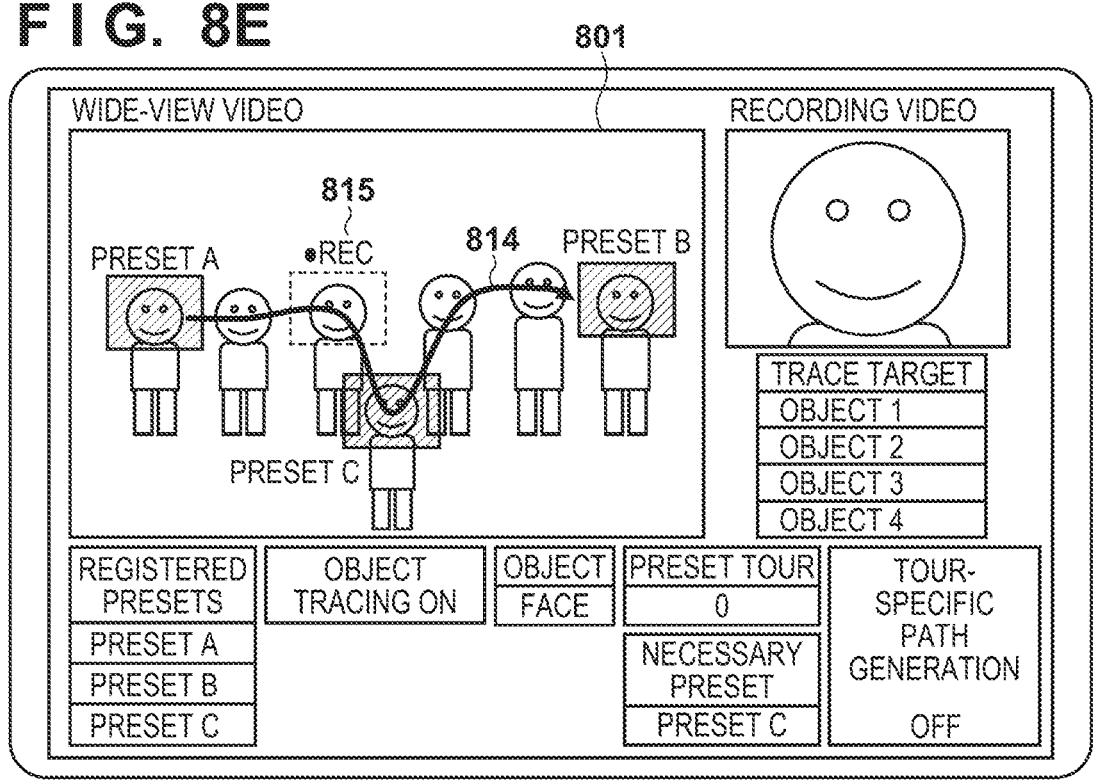
Figure 8F:
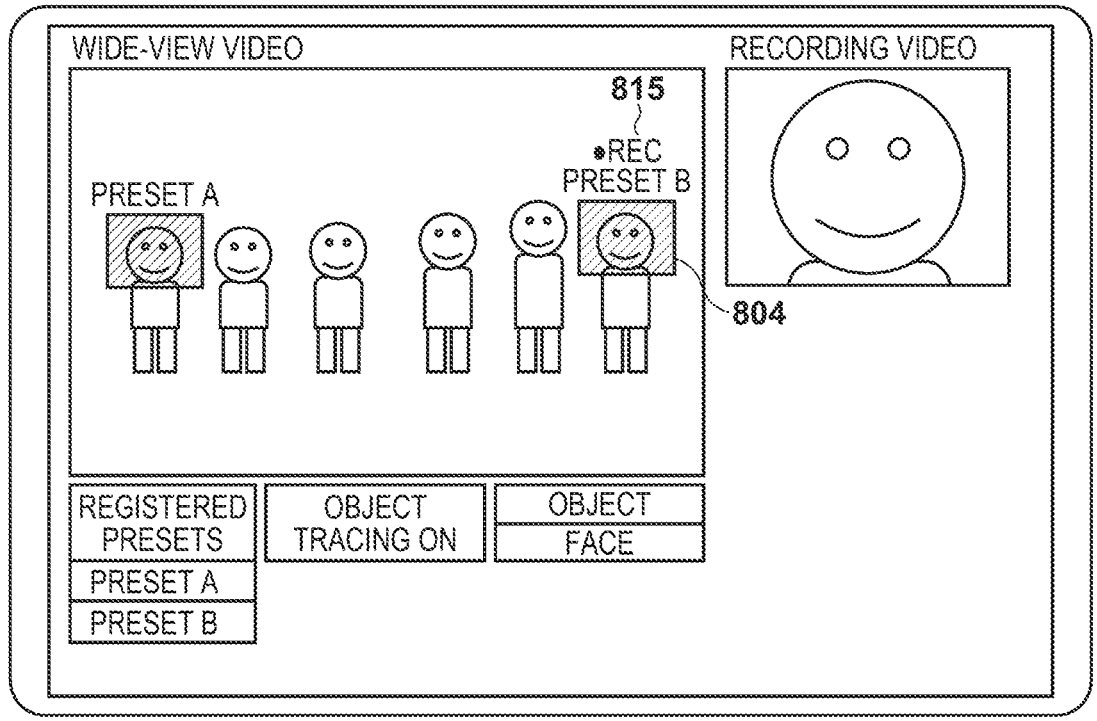

FIG. 8E illustrates a state in which a moving path 814 generated by the path generation unit 506 is displayed in an overlaid manner on the wide-view video in accordance with the conditions designated by the user in FIG. 8B to FIG. 8C. The moving path being displayed in an overlaid manner allows the user to easily recognize the moving path of the image capturing area. In addition, the image capturing position indication 815 displayed in the wide-view video display area 801 represents a change of the image capturing area (movement of PTZ) in the PTZ camera 101. In FIG. 8F, the image capturing position indication 815 indicates an image capturing area corresponding to the preset B, and the overlay display of the moving path 814 is ended, thereby, indicating to the operator that the movement of the image capturing area has been completed.

According to the above-described configuration of the first embodiment, by including in a PTZ path at the time of preset switching an object that is present in an image capturing range of a PTZ camera, it becomes possible to capture a video in which the object is traced during PZT movement. That is, by obtaining information related to a position of an object from an object recognition function and performing an operation corresponding to obtained data, a video that is suitable for viewing can be captured during PTZ movement at the time of preset image capturing.

Second Embodiment

In the first embodiment, the video production system having one PTZ camera 101 has been described. There may, however, be a plurality of PTZ cameras 101. In the second embodiment, a video production system that includes a plurality of PTZ cameras 101 will be described. The configuration of the video production system 10 is the same as that of the first embodiment (FIG. 1) except that there are a plurality of PTZ cameras 101.

The hardware configuration and the functional configuration of the information processing apparatus 104 are also the same as those of the first embodiment (FIGS. 2 and 5). However, the information processing apparatus 104 of the second embodiment can set an individual moving path for each of the plurality of PTZ cameras 101. That is, the path generation unit 506 simultaneously generates a plurality of moving paths for moving a plurality of image capturing areas. For example, when there are a plurality of objects to be traced, moving paths may be set so that tracing is distributed among a plurality of cameras. At this time, the path generation unit 506 may generate a moving path of an image capturing area to be applied to a respective PTZ camera so as to trace an object that is different from an object included in a moving path to be applied to another PTZ camera. An object to be traced by a respective camera may be automatically assigned or may be designated by the user. Further, for example, a configuration may be taken such that when two PTZ cameras are used, if an object to be traced is selected by a user operation for one PTZ camera, remaining objects are automatically set to be a trace target of the other PTZ camera. A configuration may also be taken so as to electronically reproduce image capturing at angles of view according to a plurality of PTZ values according to a plurality of PTZ cameras by cropping a plurality of partial videos from a video of the camera 103, as in the first embodiment.

According to the above-described configuration of the second embodiment, the method of the first embodiment is applied to a system including a plurality of PTZ cameras. Thus, in addition to achieving the same advantages as in the first embodiment, it becomes possible to simultaneously trace a plurality of objects even when a plurality of PTZ cameras is provided.

As described above, according to the respective embodiments, when the angle of view moves between the preset image capturing areas, camera work that traces an object is executed, thereby making it possible to obtain a video suitable for viewing even during PTZ movement.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. An information processing apparatus comprising:
one or more memories storing instructions; and
one or more processors that, upon executing the stored instructions, perform:
obtaining a video obtained by a first image capturing apparatus that captures a predetermined area;
setting a first area that is a portion of the predetermined area to be captured by a second image capturing apparatus different from the first image capturing apparatus and a second area that is a portion of the predetermined area to be captured by the second image capturing apparatus, and is different from the first area;
detecting an object in an area different from the first area of the video obtained by the first image capturing apparatus and the second area of the video obtained by the first image capturing apparatus; and
generating a moving path of an image capturing area that is to be captured by the second image capturing apparatus and that moves between the first area and the second area based on a position of the detected object.

2. The information processing apparatus according to claim 1, wherein the moving path is generated such that all objects detected in the detecting enter the image capturing area in order.

3. The information processing apparatus according to claim 1, wherein the one or more processors further perform:
selecting one or more objects from among detected objects in accordance with a user operation,
wherein the moving path is generated such that all of the selected objects enter the image capturing area in order.

4. The information processing apparatus according to claim 1, wherein the moving path is generated such that objects enter the image capturing area in an order set by a user operation.

5. The information processing apparatus according to claim 1, wherein the one or more processors further perform:
setting a third image capturing area that is different from the first area and the second area in the area to be captured,
wherein the moving path is generated so as to include the third image capturing area.

6. The information processing apparatus according to claim 5, wherein the moving path is generated so as to pass through the third image capturing area and such that objects that are not included in the third image capturing area among detected objects are captured in order.

7. The information processing apparatus according to claim 1, wherein the moving path is a path along which the image capturing area moves from the first area to the second area.

8. The information processing apparatus according to claim 1, wherein the moving path is a traveling path along which the image capturing area goes back and forth between the first area and the second area.

9. The information processing apparatus according to claim 8, wherein the traveling path is generated so as to capture an image of a different object on an outbound path and a return path, and have a different moving path between the outbound path and the return path.

10. The information processing apparatus according to claim 9, wherein the traveling path is generated such that objects to be captured by movement of the image capturing area are captured by being distributed between the outbound path and the return path.

11. The information processing apparatus according to claim 8, wherein different traveling paths of a designated number of tours are generated.

12. The information processing apparatus according to claim 1, wherein an image capturing area is enlarged to a size that is greater than the first area, and the moving path is a path along which the enlarged image capturing area moves, such that objects detected in the detecting enter the enlarged image capturing area in order.

13. The information processing apparatus according to claim 1, wherein the one or more processors further perform:

cropping from the video to be obtained by the first image capturing apparatus an image capturing area that moves based on the moving path.

14. The information processing apparatus according to claim 1, wherein the one or more processors further perform:
controlling a pan angle, a tilt angle, and a zoom scaling factor of the second image capturing apparatus, such that an angle of view of the second image capturing apparatus corresponds to an image capturing area that moves based on the moving path.

15. The information processing apparatus according to claim 1, wherein the one or more processors further perform:
setting a speed at which the image capturing area moves, based on a positional relationship between the image capturing area and an object.

16. The information processing apparatus according to claim 1, wherein a plurality of moving paths are generated, along which, a plurality of image capturing areas simultaneously move between the first area and the second area.

17. The information processing apparatus according to claim 16, wherein the plurality of moving paths are generated such that a different object among objects detected in the detecting is captured in each moving path.

18. A method of generating a moving path of an image capturing area to be executed by an information processing apparatus, the method comprising:
obtaining a video obtained by a first image capturing apparatus that captures a predetermined area;
setting a first area that is a portion of the predetermined area to be captured by a second image capturing apparatus different from the first image capturing apparatus and a second area that is a portion of the predetermined area to be captured by the second image capturing apparatus, and is different from the first area;
detecting an object in an area different from the first area of the video obtained by the first image capturing apparatus and the second area of the video obtained by the first image capturing apparatus; and
generating a moving path of an image capturing area that is to be captured by the second image capturing apparatus and that moves between the first area and the second area based on a position of the detected object.

19. A non-transitory computer-readable storage medium storing a program for causing a computer to execute a method of generating a moving path of an image capturing area to be executed by an information processing apparatus, the method comprising:
obtaining a video obtained by an image capturing apparatus that captures a predetermined area;
setting a first area that is a portion of the predetermined area to be captured by a second image capturing apparatus different from the first image capturing apparatus and a second area that is a portion of the predetermined area to be captured by the second image capturing apparatus, and is different from the first area;
detecting an object in an area different from the first area of the video obtained by the first image capturing apparatus and the second area of the video obtained by the first image capturing apparatus; and
generating a moving path of an image capturing area that is to be captured by the second image capturing apparatus and that moves between the first area and the second area based on a position of the detected object.

20. The information processing apparatus according to claim 1, wherein the one or more processors further perform, upon executing the stored instructions, displaying a screen including both a first image corresponding to the predetermined area captured by the first image capturing apparatus and a second image in accordance with the moving path by the second image capturing apparatus.

* * * * *